Jan. 1, 1929.

J. B. DAVIDSON 1,697,677

ROTARY TILLER FOR GANG PLOWS

Filed Feb. 20, 1928    3 Sheets-Sheet 1

Inventor.
Jay Brownlee Davidson.
by Orwig & Hague Attorneys.

Jan. 1, 1929.

J. B. DAVIDSON 1,697,677

ROTARY TILLER FOR GANG PLOWS

Filed Feb. 20, 1928    3 Sheets-Sheet 2

Inventor.
Jay Brownlee Davidson.
by Orwig & Hague Attorneys.

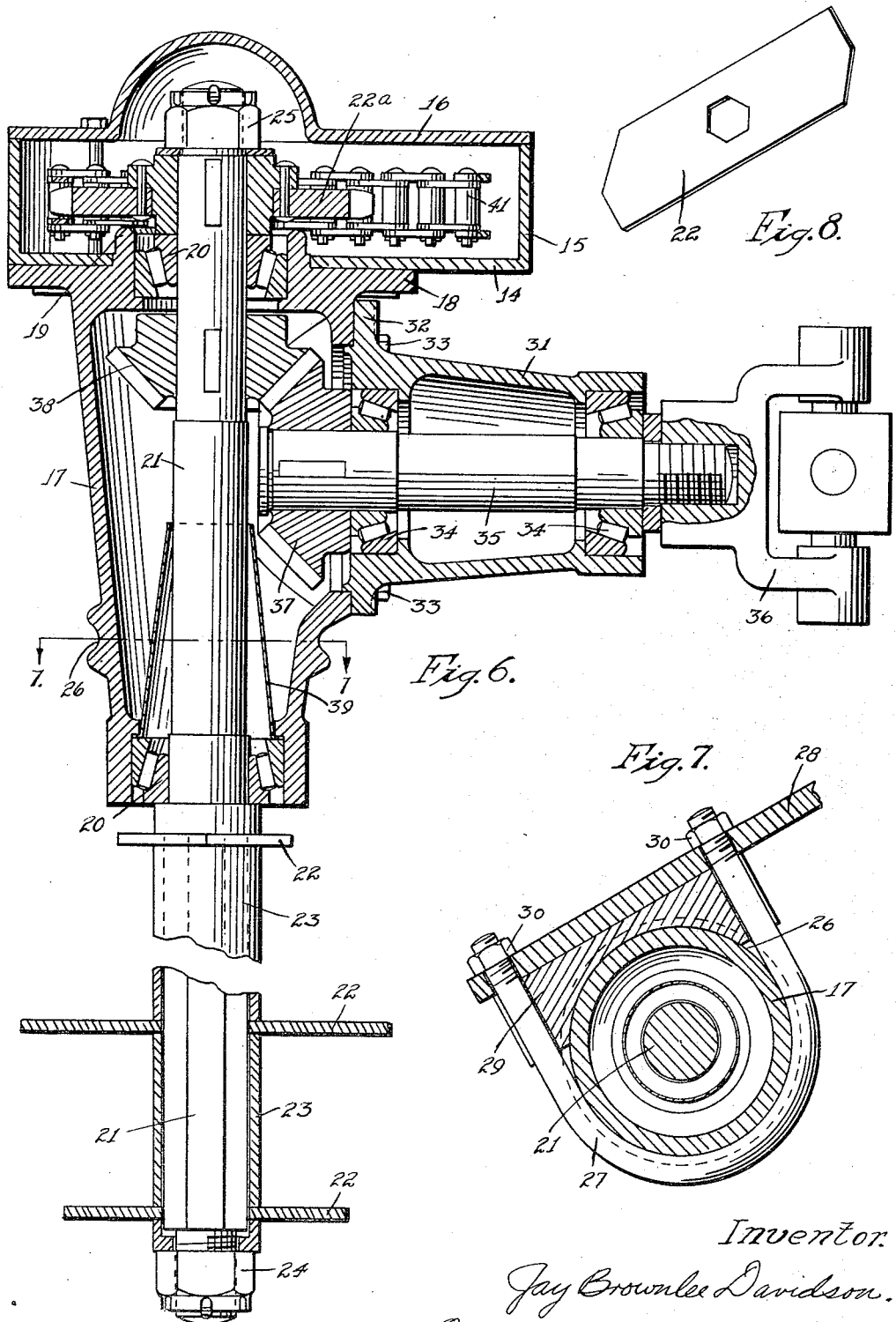

Patented Jan. 1, 1929.

1,697,677

UNITED STATES PATENT OFFICE.

JAY BROWNLEE DAVIDSON, OF AMES, IOWA.

ROTARY TILLER FOR GANG PLOWS.

Application filed February 20, 1928. Serial No. 255,701.

My invention relates to that class of rotary tillers in which there is a substantially upright shaft having a series of substantially horizontally arranged blades, and means for operating the shaft so that these blades will strike upon a furrow slice at the rear of the mould board and pulverize the soil during the time that the furrow slice passes beyond the mould board, and before it reaches the ground; and my invention relates particularly to that class of rotary tillers applied to gang plows having two or more plow bottoms.

The objects of my invention are to provide a unitary self-contained gang tiller device which may be readily, quickly and easily applied to a gang plow by an unskilled operator, and there firmly and securely held in position for supporting the various rotary tillers in proper relationship to the adjacent plow mould board; and also to provide a device of this character of simple, durable and inexpensive construction; and further to provide improved and simplified means for oiling the various working parts of the device.

My invention consists in the construction, arrangement and combination of the various parts of the device, whereby the objects contemplated are attained, as hereinafter more fully set forth, pointed out in my claims, and illustrated in the accompanying drawings, in which:

Figure 6 shows an enlarged, detail, sectional view on the line 6—6 of Figure 2.

Figure 7 shows an enlarged, detail, sectional view on the line 7—7 of Figure 6; and Figure 8 shows a perspective view of one of the tiller blades.

Figure 1:
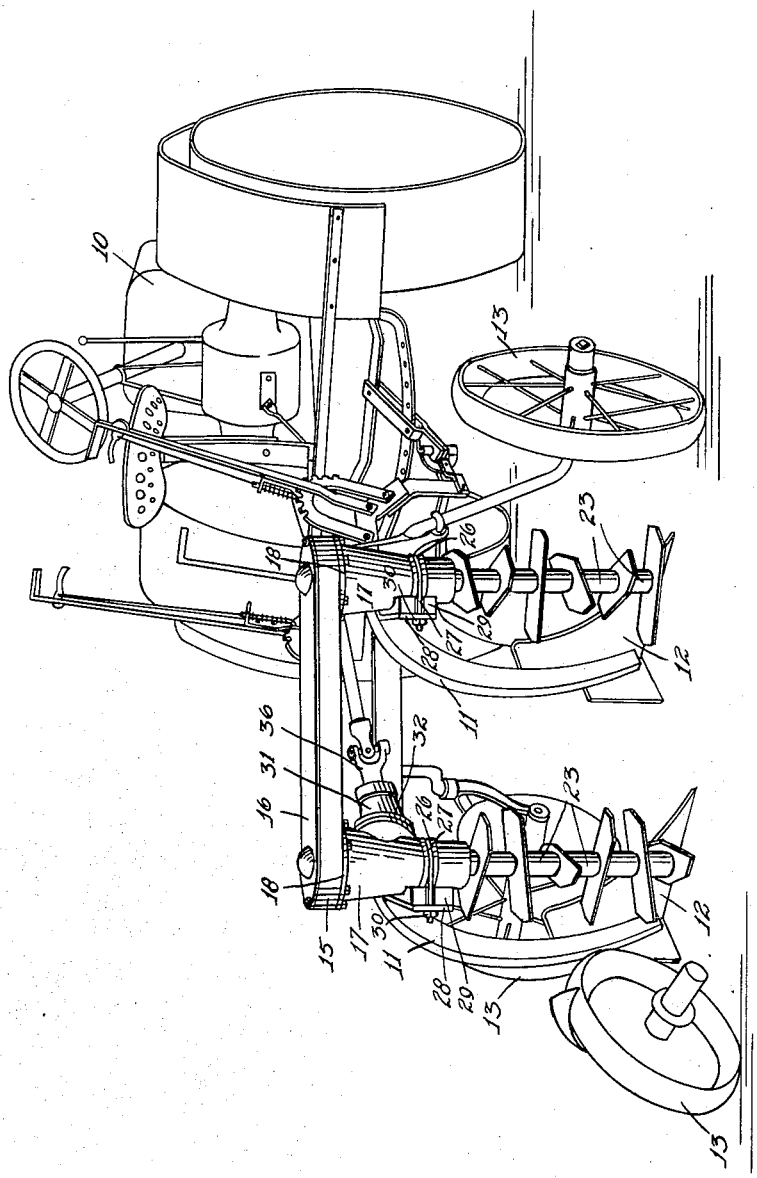
Figure 1 shows a perspective view of a gang plow and a tractor hitched to it, and my improved rotary tiller applied to the gang plow as in use.

Referring to the accompanying drawings, I have used the reference numeral 10 to indicate generally a tractor. The gang plow comprises a frame 11 with plows 12 thereon and supporting wheels 13. The plow is of the ordinary construction now in common use, and any gang plow of the sulky type may be used in connection with my rotary tiller.

My improved rotary tiller comprises a main frame member comprising a bottom member 14 having integral upright sides and ends 15, and a detachable cover 16. This frame is made strong enough to withstand the strains to which the various rotary tillers supported by it are subjected.

At one end of the main frame there is a tiller shaft housing indicated generally by the numeral 17. At the top of the housing there is an outwardly extended circular flange 18, and an upwardly extended circular rib 19 designed to be projected through an opening in the frame bottom member 14. At both the upper and lower ends of the housing 17 there is a roller bearing device 20, and mounted in these bearings 20 is a rotary tiller shaft 21, which projects a considerable distance below the housing 17 and has applied thereto a series of rotary tiller blades 22, and blade spacing and supporting sleeves 23, all held together by a nut 24 at the lower end of the shaft. The upper end of the shaft 21 has a sprocket wheel 22 and a nut 25 is applied to the top of the upper end of the tiller shaft.

Near the lower portion of the tiller shaft housing there is formed an annular groove 26 designed to receive a U-bolt 27. This U-bolt extends through a bracket 28, and a block 29 is interposed between the bracket 28 and the tiller shaft housing 17, which block has one edge shaped to fit the tiller shaft housing and its other edge shaped to fit the bracket 28, and nuts 30 are applied to the ends of the U-bolts whereby the housing may be quickly and easily fixed to the bracket, and when so fixed the rotary tiller attachment will be firmly held to the bracket and accurately positioned relative to the plow beam and plow.

At one side of the housing 17 there is an opening for the propeller shaft, and the propeller shaft housing 31 is provided and has a flange 32 to engage the adjacent side of the tiller shaft housing 17 to which it is firmly fixed by bolts 33. Roller bearings 34 are mounted in both ends of the housing 31, and they receive a propeller shaft member 35 which has at its outer end a universal joint 36, and at its inner end a beveled pinion 37, which latter is contained within the housing 17 and is in mesh with a beveled pinion 38 on the rotary tiller shaft 21.

Mounted within the housing 17 is a sleeve 39 extended from a point just above the roller bearing 20 to a point adjacent to the propeller shaft 35. This sleeve surrounds, but does not contact with, the rotary tiller shaft 21, but is held stationary in its position within the housing 17 for purposes hereinafter made clear.

At the opposite end of the main frame there is another tiller shaft housing 40, which is like the housing 17 except that it does not have the propeller shaft or the beveled pinions, and there is no need for the sleeve 39. In other respects the assembly of the tiller shaft housing 40 and the tiller are the same as that before described in regard to the housing 17 and its associated parts.

Figure 5:
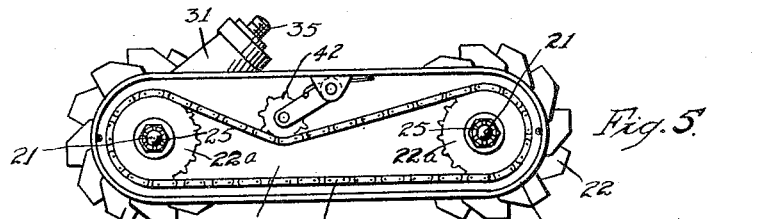
Figure 5 shows a view similar to Figure 4 adapted for a gang plow having two plow bottoms.
Figure 4:
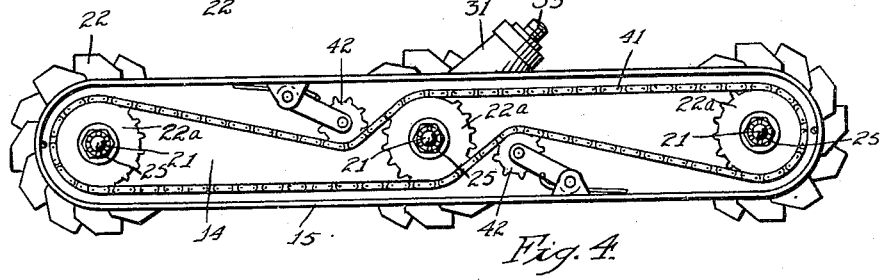
Figure 4 shows a top or plan view of same with the cover removed to illustrate the sprocket gearing.
Figure 3:
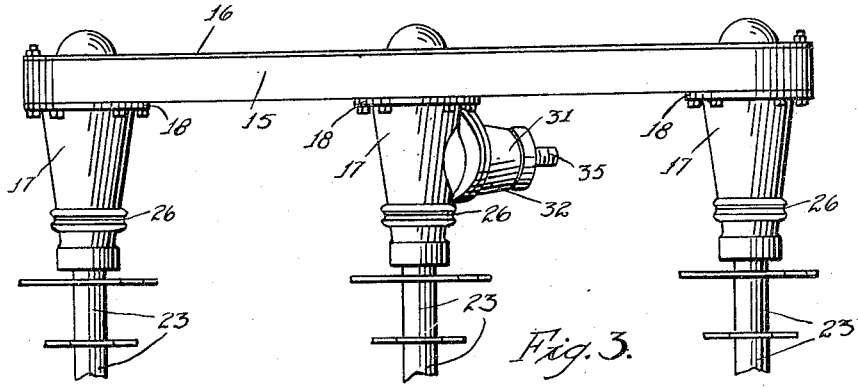
Figure 3 shows a rear elevation of a modified form of my improved rotary tiller device adapted for use in connection with a gang plow having three plow bottoms.
Figure 2:
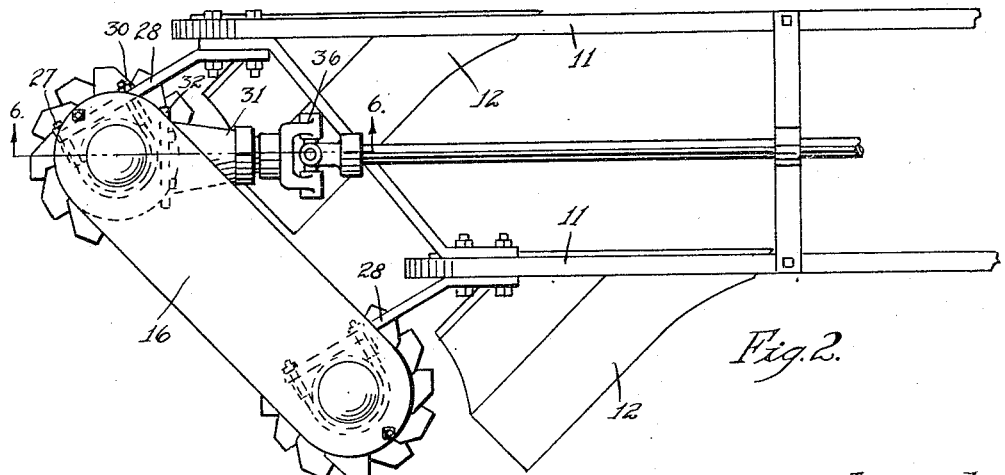
Figure 2 shows a top view illustrating the frame of a gang plow with two plow bottoms thereon, and my improved rotary tiller applied thereto.

Referring to Figure 5 of the drawings, it will be seen that the two sprocket wheels 22 on the respective tiller shafts are connected by a sprocket chain 41, and a chain tightener sprocket 42 is applied to this chain 41 intermediate to the sprocket wheels 22.

From the foregoing it will be seen that the device comprises a unitary, self-contained structure, which may be readily and easily fitted to a gang plow by unskilled workmen, it being only necessary to place the U-bolts 27 through the brackets 28 and apply the nuts 30 to the U-bolts and then to connect a power shaft with the power-take-off of the tractor in any ordinary way.

It will also be seen that the attachment is of very simple construction, and yet the parts thereof are firmly braced and supported, giving it great rigidity and durability. The main frame 14 and 15, in addition to its function as a frame, serves another function of a sprocket wheel and chain housing and an oil receptacle, as will hereinafter appear, and the tiller shaft housings 17 and 40 perform the function of providing a bearing for the tiller shafts, but they also form frame structures for connecting the devices to a gang plow.

It is of great importance in devices of this kind that the working parts be thoroughly lubricated, and I have designed the entire structure with the idea of providing a simple and effective lubrication means for all of the working parts. The main frame 14 and 15 is designed to form an oil receptacle and the sprocket chain is so positioned in the receptacle that the lower portions at least of the sprocket chain links will run in oil, and by this means oil will be transmitted to all of the sprocket links and bearings. The oil is prevented from running down into the tiller shaft housing by the upright rib 19, so that a quantity of oil is contained at all times within the main frame.

In order to maintain an oil supply for constant lubrication of the propeller shaft 35 and its bearings and gears, I have provided the sleeve 39 which functions as follows: A measured quantity of oil is placed in the main frame and after the oil reaches the level of the rib 19, some of it will overflow through the bearings and into the space between the interior of the tiller shaft housing and the sleeve 39, thus forming an oil receptacle. Into this oil receptacle at one side the beveled gear wheel 37 runs, and this oil receptacle is of a level higher than the bearings 34, so that oil will flow through the bearings 34 until the oil level is below the level of these bearings; thereafter the bevel gear wheel will pick up oil and transmit it to the shaft 35 and the oil will then work out along this shaft and provide a constant lubrication for the bearings 34, and this will also provide a constant lubrication for the beveled pinion 38.

From the foregoing it will be seen that all of the working parts are constantly and adequately lubricated by oil from the sprocket casing of the main frame, and it is only necessary to place oil in the sprocket casing to provide a sufficient supply for the constant and adequate lubrication for all of the working parts.

I claim as my invention:

1. A rotary tiller for gang plows, comprising a main frame member formed hollow, a number of tiller shaft housing members fixed to and extended downwardly from the main frame, means for securing said tiller shaft housing members to a gang plow frame, a tiller shaft in each of said housings, a power shaft housing member fixed to one of the tiller shaft housing members, a power shaft in the power shaft housing member, means for gearing it to the adjacent tiller shaft, and means within the hollow main frame member for operatively connecting all of the tiller shafts.

2. A rotary tiller for gang plows, comprising a main frame member formed hollow, a number of tiller shaft housing members fixed to and extended downwardly from the main frame, means for securing said tiller shaft housing members to a gang plow frame, a tiller shaft in each of said housings, a power shaft housing member fixed to one of the tiller shaft housing members, a power shaft in the power shaft housing member, means for gearing it to the adjacent tiller shaft, and means within the hollow main frame member for operatively connecting all of the tiller shafts, said means comprising sprocket wheels fixed to the said tiller shafts, a sprocket chain passed around them, and a chain tightener device engaging the chain.

3. In a device of the class described, the combination of a main frame comprising a bottom and integral upwardly extended sides and end portions, a detachable cover, a number of downwardly extending housing members fixed to the main frame, and means for detachably connecting the housing members one to each beam of a gang plow.

4. In a device of the class described, the combination of a main frame comprising a bottom and integral upwardly extended sides and end portions, a detachable cover, a number of downwardly extending housing members fixed to the main frame, means for detachably connecting the housing members one to each beam of a gang plow, said means comprising a U-shaped bolt passed around the housing, and a bracket designed to receive the bolt and to be fixed to a plow.

5. In a device of the class described, the combination of a tiller shaft housing member, a tiller shaft extended upwardly through it, bearings for the tiller shaft at the upper and lower ends of the housing members, a power shaft housing member fixed to one side of the tiller shaft housing member, a power shaft rotatively mounted therein, bearings for the power shaft near both ends of the power shaft housing member, pinions fixed to the shafts and in mesh with each other, and an oil retaining sleeve mounted in the lower end portion of the tiller shaft housing and extended upwardly to a point adjacent to the tiller shaft and above the lower end of the pinion on the power shaft for transmitting oil from the oil receptacle in the bottom of the tiller shaft housing to the pinions and from them to the bearings of the power shaft.

6. In a device of the class described, the combination of a main frame member comprising a bottom and upwardly extended side and end members and a cover, a tiller shaft housing fixed to the said bottom, a tiller shaft mounted in the tiller shaft housing and projected upwardly into the main frame member, a gearing device mounted on the top of the tiller shaft and within the main frame member, a bearing for the upper end portion of the tiller shaft, and a rib extended around the opening through which the tiller shaft projects into the main frame to thereby form an oil pocket in the main frame in which the said gearing device may operate and be lubricated, and whereby the surplus oil that passes over the said rib will pass through the said bearing.

Des Moines, Iowa, January 24, 1928.

JAY BROWNLEE DAVIDSON.